US009669432B2

(12) United States Patent
McCarthy et al.

(10) Patent No.: US 9,669,432 B2
(45) Date of Patent: Jun. 6, 2017

(54) COMPONENT FEEDING SYSTEM

(71) Applicants: Tyco Electronics Corporation, Berwyn, PA (US); Tyco Electronics Technology (Kunshan) Co. Ltd., Kunshan (CN); Tyco Electronics (Shanghai) Co. Ltd., Shanghai (CN)

(72) Inventors: Sean Patrick McCarthy, Palmyra, PA (US); Steven Alan Jarrett, Hummelstown, PA (US); Bicheng Chen, Harrisburg, PA (US); Haiping Kang, Suzhou (CN); Yingcong Deng, Shanghai (CN)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 516 days.

(21) Appl. No.: 14/011,295

(22) Filed: Aug. 27, 2013

(65) Prior Publication Data

US 2015/0066200 A1 Mar. 5, 2015

(51) Int. Cl.
*G06F 7/00* (2006.01)
*B07C 5/342* (2006.01)

(52) U.S. Cl.
CPC .................................. *B07C 5/3422* (2013.01)

(58) Field of Classification Search
CPC .................................................... B07C 5/3422
USPC ........................................................ 700/218
See application file for complete search history.

(56) References Cited

U.S. PATENT DOCUMENTS 4,909,376 A * 3/1990 Herndon ................ B25J 9/1697 198/395
4,952,109 A * 8/1990 Hendricks .............. B65G 27/06 221/312 R
5,314,055 A 5/1994 Gordon
5,946,449 A 8/1999 Dickerson et al.
6,522,777 B1 * 2/2003 Paulsen .............. G01B 11/2513 356/237.2

(Continued)

FOREIGN PATENT DOCUMENTS

EP 0135495 3/1985
EP 0180926 A2 5/1986

OTHER PUBLICATIONS

Miyakawa, A., et al., "A Flexible Assembly Station with Visual Sensors", IECON '84, International Conference on Industrial Electronics, p. 1036-1040, Oct. 22-26, 1984.

*Primary Examiner* — Kyle Logan

(57) ABSTRACT

A component feeding system includes a platform and a tray supported by the platform having a component support surface for supporting a plurality of components. An agitation unit is supported by the platform and is operatively coupled to the tray to agitate the tray to cause the components to move on the tray. A guidance system is supported by the platform and has a camera viewing the tray. A positioning system is supported by the platform and a component gripper is supported by the positioning system and moved by the positioning system relative to the tray. The component gripper is configured to pick and place components on the tray. A controller communicates with the agitation unit, the positioning system, the component gripper and the guidance system. The controller operates the agitation unit, the positioning system and the component gripper based on an image obtained by the camera.

20 Claims, 9 Drawing Sheets

(56) References Cited

U.S. PATENT DOCUMENTS

| | | | | |
|---|---|---|---|---|
| 6,598,730 | B1 * | 7/2003 | Gertsch | H05K 13/028 198/394 |
| 6,810,741 | B1 * | 11/2004 | Lafleur | G01M 7/00 73/571 |
| 8,550,233 | B2 * | 10/2013 | Perroud | B65G 27/34 198/502.2 |
| 2004/0158348 | A1 * | 8/2004 | Foulke | G03F 7/70741 700/218 |
| 2006/0278498 | A1 * | 12/2006 | Uusitalo | B65G 47/5145 198/525 |
| 2009/0055024 | A1 * | 2/2009 | Kay | B25J 9/1697 700/259 |
| 2015/0173204 | A1 * | 6/2015 | Gieskes | B23P 21/00 29/832 |

* cited by examiner

COMPONENT FEEDING SYSTEM

BACKGROUND OF THE INVENTION

The subject matter herein relates generally to component feeding systems.

Component feeding machines are in use for feeding electrical components along a tray or conveyor system, where the electrical components can be picked and placed by a machine during an assembly process. For example, contacts and other components may be fed to a robot that picks the contacts or components up and places them in a housing to form an electrical connector. Conventional feeding machines are not without disadvantages. For instance, feeding systems use dedicated feeding machines that are designed to feed one particular type and/or size of component. Different components with different geometry and/or different materials need different feeding machines or changes to the machines. Significant tooling is required to change from one product to another product leading to significant down-time. Additionally, the robot that is used to pick up the component is typically configured to only pick up one particular type of component. A tooling change-over and new control logic is needed for the robot to pick up different components. The feeding machine is taken off-line and processing is stopped to complete the change over.

There is a need for a cost effective automated process of sorting components without human operator intervention.

BRIEF DESCRIPTION OF THE INVENTION

In one embodiment, a component feeding system is provided including a platform and a tray supported by the platform that has a component support surface for supporting a plurality of components thereon. An agitation unit is supported by the platform and is operatively coupled to the tray. The agitation unit agitates the tray to cause the components to move on the tray. A guidance system is supported by the platform and has a camera viewing the tray. A positioning system is supported by the platform and a component gripper is supported by the positioning system and moved by the positioning system relative to the tray. The component gripper is configured to pick and place components on the tray. A controller communicates with the agitation unit, the positioning system, the component gripper and the guidance system. The controller operates the agitation unit, the positioning system and the component gripper based on an image obtained by the camera.

Optionally, the camera may differentiate the components based on one or more datum on the components. The controller may operate the positioning system to control a position of the component gripper based on the location of the one or more datum of the component.

Optionally, the controller may develop a motion profile for the agitation unit. The motion profile may control the frequency, direction and/or amplitude of agitation of the tray to manipulate the orientation of the components relative to the tray. The controller may operate the agitation unit in a forward mode to cause the components to move toward a front of the tray and in a backward mode to cause the components to move toward a rear of the tray. The controller may operate the agitation unit in an impulse mode to cause the components to bounce upward off of the tray.

Optionally, the controller may develop a motion profile for the positioning system to move the component gripper. The motion profile may have movements for picking up a first component of the plurality of components, moving the first component to a predetermined location and then picking up a second component of the plurality of components.

Optionally, the tray may receive different types of components. The controller may determine the type of components based on the image obtained from the camera. The controller may determine an agitation algorithm to adjust an agitation protocol of the agitation unit based on the type of component. The component gripper may include at least one of a magnet, fingers and a vacuum device for gripping the components.

Optionally, the positioning system may include an X positioner, a Y positioner, and a Z positioner to control a position of the component gripper in 3D space. The positioning system may include an arm supporting the component gripper and supporting the camera. The camera may be movable with the arm and the component gripper. The arm may support a lighting device illuminating the tray and components.

Optionally, the component feeding system may include a backlight under the tray. The tray may be translucent to allow light from the backlight through the tray. The backlight may be operatively coupled to the controller and the controller may change a spectrum and intensity of the light based on characteristics of the components on the tray. The controller may determine a lighting control algorithm to adjust the lighting scheme of the backlight based on the image obtained by the camera.

In another embodiment, a component feeding system is provided including a platform and a tray supported by the platform. The tray has a component support surface for supporting a plurality of components thereon. The tray has a plurality of grooves separated by dividers with different types of components being arranged in different grooves and separated by the dividers. An agitation unit is supported by the platform and is operatively coupled to the tray. The agitation unit agitates the tray to cause the components to move on the tray. A guidance system is supported by the platform and has a camera viewing the tray. A positioning system is supported by the platform and a component gripper is supported by the positioning system and moved by the positioning system relative to the tray. The component gripper is configured to pick and place components on the tray. A controller communicates with the agitation unit, the positioning system, the component gripper and the guidance system. The controller operates the agitation unit, the positioning system and the component gripper based on an image obtained by the camera.

Optionally, the tray may extend between a front and a rear. The dividers at the rear may be taller to define bins holding supplies of the different types of components. The components may be fed toward the front of the tray from the bins as the tray is agitated. The dividers may extend from a base to a peak with the base being wider than the peak. A height of each divider may be less than a height of the components in the groove adjacent the divider such that at least a portion of the component is positioned above a peak of the divider. The tray may have a generally uniform thickness along both the grooves and the dividers.

DETAILED DESCRIPTION OF THE INVENTION

Figure 1:
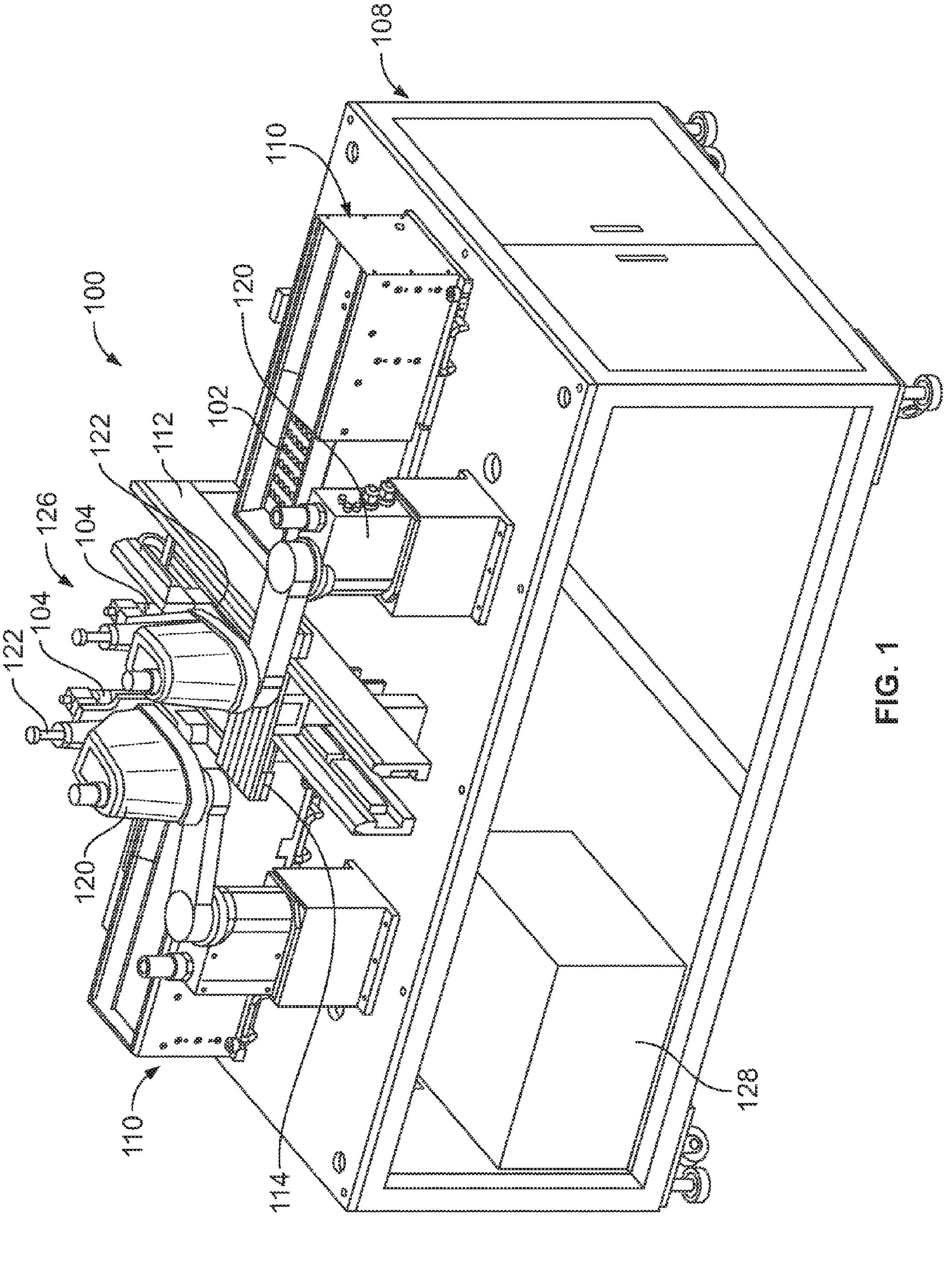
FIG. 1 illustrates a component feeding system formed in accordance with an exemplary embodiment.

FIG. 1 illustrates a component feeding system 100 formed in accordance with an exemplary embodiment. The component feeding system 100 is used for feeding components 102, such as electrical components for electrical connectors, for further processing. For example, the components 102 may be sorted, gathered in a container for shipment, placed in another device such as a connector, circuit board or other type of device, assembled or otherwise manipulated by the component feeding system 100. The component feeding system 100 automatically sorts the components 102 for identification and manipulation using an automated process.

The component feeding system 100 provides vision guidance using a camera 104 or other device to collect images and data relating to the components 102 and dynamically change parameters and control of the parts of the component feeding system 100. Optionally, different types of components 102 may be simultaneously presented to the component feeding system 100. The component feeding system 100 identifies specific component types and locations using datum or other identifying features of the components to track the components 102, separate the components 102, pick up the components 102 and/or place the components 102. In an exemplary embodiment, the components 102 may need to be in a particular orientation (for example, extend axially) in order to be picked and placed. The component feeding system 100 uses images from the camera 104 to identify characteristics of the components, such as the layout, shape, positional data, color and the like, to distinguish which component 102 is which and to develop a motion profile for properly picking and placing each of the components 102. For example, the component feeding system 100 may determine when components are overlapping or are laying transverse to a desired orientation and then manipulate the system to spread the components 102 apart and/or change the way the components 102 lay. The parameters and control of the component feeding system 100 may be based on geometrical characteristic data of the components 102 obtained based upon the image captured by the camera 104.

In the illustrated embodiment, the component feeding system 100 processes a plurality of different types of components 102. For example, the component feeding system 100 may process contacts, ferrules, pins, plastic spacers, plastic housings, washers, rubber boots and/or other types of components 102 that are used to form an electrical connector. The component feeding system 100 may process different sized and different shaped components 102. The component feeding system 100 is capable of processing multiple product type without significant tooling investment or changeover of the system, thus allowing reduced tooling change over time. The different components 102 may be presented simultaneously or may be presented in different batches. The control of the parts or modules of the component feeding system 100 may be synchronized or managed to ensure the components 102 are properly processed.

The component feeding system 100 may be part of a larger machine, such as positioned at a station before or after other stations. The component feeding system 100 includes a platform 108 that forms a base or supporting structure for the other modules of the component feeding system. The platform 108 supports one or more tray assemblies 110 that are used for sorting and/or delivering the components 102. Each tray assembly 110 holds the components 102.

In an exemplary embodiment, the platform 108 supports a track 112 adjacent one or more of the tray assemblies 110. The track 112 has a receiving unit 114 positioned thereon. The components 102 are configured to be picked and placed in or on the receiving unit 114. The track 112 allows the receiving unit 114 to move to another location, such as to receive the component 102 or to transport the components 102 to another location, such as another station or machine. The receiving unit 114 may be a receptacle or bag that receives the components 102 and packages the components together, such as for shipping. The receiving unit 114 may be a tray or fixture that holds the components 102 in a predetermined arrangement, such as for presentation to another machine or station for assembly into an electrical connector. The receiving unit 114 may be a connector or housing that receives the components 102, for example, the components may be pins or contacts that are loaded into the housing to form an electrical connector. The receiving unit 114 may be a feed tray or conveyor that takes the component 102 to another machine.

The component feeding system 100 includes one or more positioning systems 120 supported by the platform 108. In an exemplary embodiment, each positioning system 120 is used to position the camera 104 relative to the corresponding tray assembly 110 during operation of the component feeding system 100. Alternatively, the camera 104 may be mounted stationary relative to the platform 108 having a field of view that includes the corresponding tray assembly 110. The positioning system 120 is used to position one or more component grippers 122 relative to the tray assembly 110 during operation of the component feeding system 100.

The component feeding system 100 includes an agitation unit 124 (shown in FIG. 3) supported by the platform 108. The agitation unit 124 is operatively coupled to the tray assembly 110. The agitation unit 124 may be mechanically, either directly or indirectly, to the tray assembly 110. The agitation unit 124 may be housed in the tray assembly 110. The agitation unit 124 is used to agitate the tray assembly 110 to cause the components 102 to move on the tray assembly 110. The components 102 may be moved back-and-forth, side-to-side, flipped or otherwise manipulated by the agitation unit 124 to orient the components 102 relative to one another and relative to the tray assembly 110 for identification and manipulation by the component gripper 122. The agitation unit 124 may separate the components 102 within the tray assembly 110, such as by controlling the acceleration of the movement in different directions. By differentiating accelerations in different directions, the components 102 can move backward, move forward and be separated.

The component feeding system 100 includes a guidance system 126 supported by the platform 108. The camera 104 forms part of the guidance system 126. The guidance system 126 images the components 102 for controlling other operations of the component feeding system 100.

The component feeding system 100 includes a controller 128 for controlling operation of the various parts of the component feeding system 100. The controller 128 and other components may form a closed-loop feedback system. The controller 128 communicates with the agitation unit 124, the positioning system 120, the component gripper 122, the guidance system 126 and/or other units or modules to control operation thereof. For example, the controller 128 may receive images or signals from the camera 104 and/or guidance system 126 and may determine the relative positions of one or more of the components 102 based on such images or signals. The image analysis can be BLOB analysis, edge identification or analysis by other algorithms falling under a general category of machine vision algorithms. The controller 128 may be defined by one or more individual or integrated controllers that provide one or more functions or controls. For example, individual controllers may operate to control different aspects of the overall system. The controller 128 generally refers to an overall system controller, which may be defined by one or more individual controllers. For example, the controller 128 may include a vision controller, which may be integrated with and part of the guidance system 126 and connected to the central or system controller 128. The vision controller may be responsible for image post-processing, lighting adjustment and machine vision algorithm execution. The controller 128 may include an agitation controller for controlling or driving the agitations unit 124, which may be connected to the central or system controller 128.

The controller 128 may be able to determine the type of component 102 from the images or signals, which may affect the other control parameters. The controller 128 may then control operation of the other modules, such as the agitation unit 124, the positioning system 120 and the component gripper 122 in accordance with certain control parameters or protocols. For example, the controller 128 may cause the agitation unit 124 to agitate the components 102 by controlling the frequency, direction, acceleration, amplitude or other characteristics of agitation of the tray assembly 110 to manipulate the orientation of the components 102 relative to the tray assembly 110. The controller 128 may cause the positioning system 120 to move the component gripper 122 and/or camera 104 to a particular location. The controller 128 may cause the component gripper 122 to grip one of the components 102 or release one of the components 102. The control of the systems may be dependent on data from the guidance system 126. The controller 128 may perform motion profile planning based on the type and position of the component 102. The controller 128 may store a database locally or access a database remotely to obtain a pre-programmed motion profile algorithm to pick up or manipulate different parts.

Figure 2:
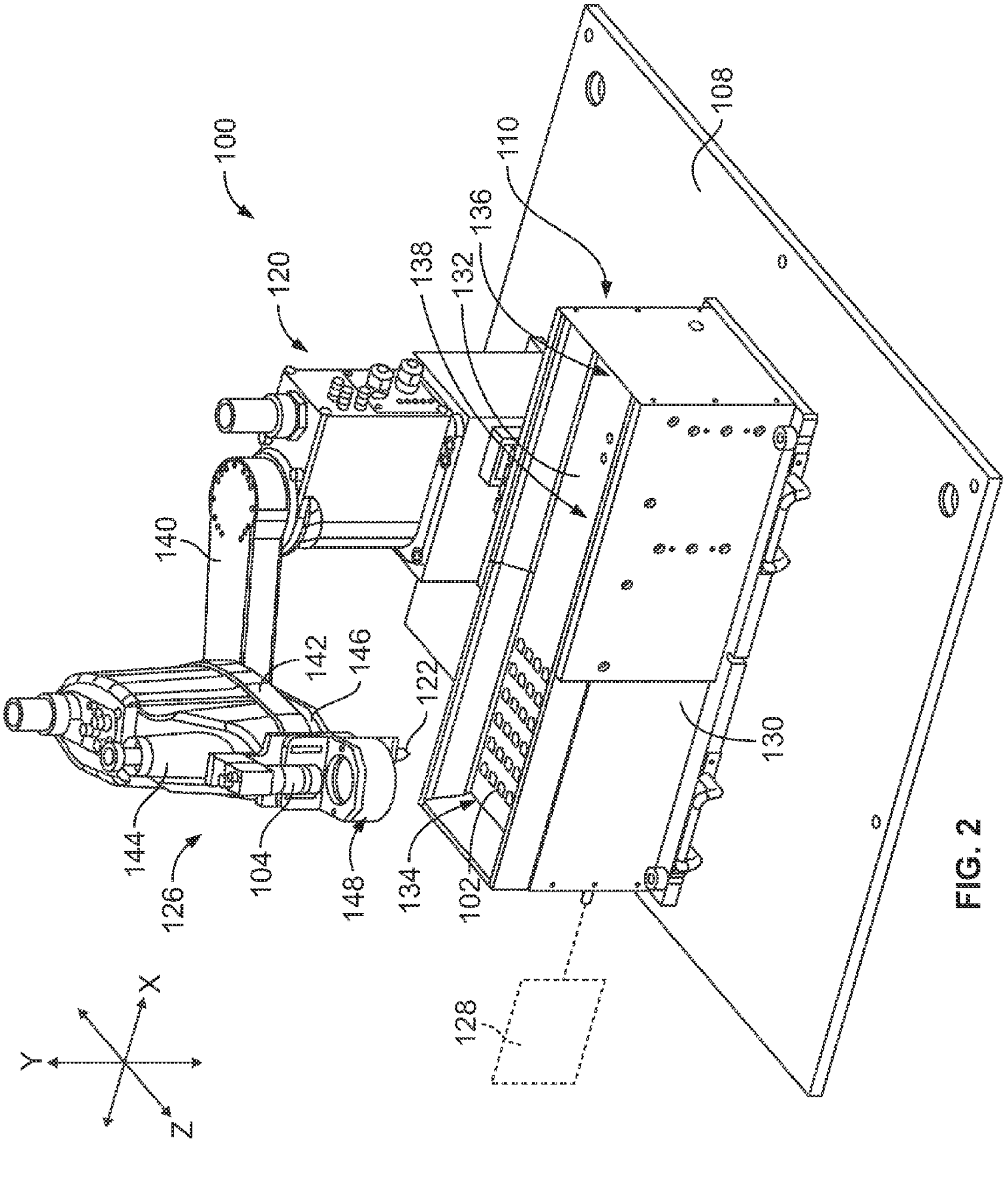
FIG. 2 illustrates a portion of the component feeding system showing a tray assembly with a positioning system, component gripper and camera positioned above the tray assembly.

FIG. 2 illustrates a portion of the component feeding system 100 showing one of the tray assemblies 110 with the corresponding positioning system 120, component gripper 122 and camera 104 positioned above the tray assembly 110. The tray assembly 110 includes a frame 130 mounted to the platform 108 and a tray 132 coupled to the frame 130. The frame 130 may be adjustable to hold different sized or shaped trays 132. In the illustrated embodiment, the frame 130 and corresponding tray 132 are rectangular in shape; however the frame 130 and tray 132 may have other shapes in alternative embodiments, such as a triangular shape or other shapes. The frame 130 may hold the tray 132 generally horizontally. Alternatively, the frame 130 may hold the tray 132 in an inclined orientation. The tray 132 extends between a front 134 and a rear 136. The components 102 may be supplied to the rear 136 of the tray 132 and moved generally toward the front 134 of the tray 132 during operation. The frame 130 surrounds the agitation unit 124, which is used to move the components 102 along the tray 132.

The tray 132 has a component support surface 138 that supports the components 102. The component support surface 138 may be flat or planar. Alternatively, the component support surface 138 may have a profiled surface, such as having grooves separated by dividers for separating the components 102, such as separating different types of components from one another. The tray 132 may be manufactured by molding, extruding, three dimensional printing or by other forming techniques. The component support surface 138 may provide a frictional force on the components 102 to help hold the components 102 on the tray 132, such as by balancing dynamic interaction between the components 102 and the tray 132 during the agitation process. The friction profile and motion profile of the agitator allows controlled separation and movement of the components 102. Optionally, the tray 132 may be translucent to allow backlighting therethrough to assist the guidance system 126 to identify the components 102. In an exemplary embodiment, the tray 132 has a generally uniform thickness such that the backlighting through the tray 132 is uniform.

In operation, the agitation unit 124 is operated to vibrate or agitate the tray 132. The agitation unit 124 may control the vibration, such as by controlling the frequency, acceleration, direction and/or amplitude of agitation, to spread out the components 102. The agitation unit 124 infuses mechanical energy into the tray 132 to move the components 102 in a certain direction, such as forward, rearward, upward or side-to-side. The components 102 that are resting entirely on the component support surface 138 may move differently than the components 102 that happen to be laying across other components 102, for example, due to the friction that the components 102 on the component support surface 138 encounter. Additionally, components 102 that are oriented axially along the direction of movement may move differently than components that are oriented transversely with the direction of movement during agitation by the agitation unit 124. Agitation of the tray 132 may affect different components 102 differently, causing the components 102 to be manipulated in certain ways. The agitation unit 124 may cause back-to-front motion, front-to-back motion, side-to-side motion, impulse or flipping motion or other types of motion depending on how the agitation unit 124 is controlled by the controller 128. The mechanical vibration causes the components 102 to reorient along the tray 132 for component recognition and manipulation.

The component gripper 122 is used to physically grip and move the components 102. The component gripper 122 may include a magnet, fingers, a disk, a vacuum device or another type of device to grip the component 102. Optionally, the component gripper 122 may include different types of gripping devices for gripping different types or sizes of components 102. The component gripper 122 is movable in three dimensions to move according to a particular motion profile determined by the component feeding system 100 based on the particular arrangement and/or location of the component 102 and/or receiving unit 114 (shown in FIG. 1).

In an exemplary embodiment, the positioning system 120 includes an X positioner 140, a Y positioner 142 and a Z positioner 144 to allow movement of components of the component feeding system 100 in three dimensional space. A coordinate system is illustrated in FIG. 2 showing mutually perpendicular X, Y and Z axes. In an exemplary embodiment, the positioners 140, 142, 144 include motors for control thereof, which may be electric motors, pneumatic motors, or other types of motors. The motors may be servo motors. The positioning system 120 may include and at least one angular or rotational positioner for allowing movement in different directions. In the illustrated embodiment, the positioning system 120 is a Cartesian motion robot with rotary axis. Other types of systems may be used in other embodiments, such as a selective compliance assembly robot arm (SCARA) or other robotic motion system.

The positioning system 120 includes an arm 146 at an end thereof. The component gripper 122 may be coupled to the arm 146. The component gripper 122 is movable with the positioners 140, 142, 144. The arm 146 may support the camera 104. The camera 104 may be coupled to other components in alternative embodiments while being movable with the positioning system 120. Optionally, multiple cameras 104 may be provided that view the component area at different angles. Alternatively, a stereoscope may be used. The camera 104 is aimed at the tray 132 and takes images of the component gripper 122 and/or the components 102. Optionally, the camera 104 may take continuous images and the component feeding system 100 may continuously update operation based on such images. Alternatively, the camera 104 may take images at predetermined times, such as at different locations prior to picking up a component 102, at various stages of the placement of the component 102, at predetermined time intervals (e.g. 1 image per second), and the like.

In an exemplary embodiment, the guidance system 126 includes an optical component 148 for controlling optical characteristics of the component feeding system 100. For example, the optical component 148 may include an illumination source for illuminating the top of the tray 132, the component gripper 122 and/or the components 102. The illumination source 148 may emit lights at different wavelengths on the components 102 to facilitate identification of the corresponding components 102. The different light wavelengths may be used to distinguish different color components 102 or components 102 made of different materials from one another. The lights may provide shadows to identify overlapping of certain components 102.

The controller 128 includes a motion planning and process parameter calculation algorithm. The controller 128 includes a component sorting algorithm that formulates a motion profile for the component feeding system 100. The component sorting algorithm is based on the images provided by the camera 104. The component sorting algorithm identifies each individual component 102, including the shape and location of the component 102 and identifies the proper final position of the component 102 based on the particular component 102 identified. The component sorting algorithm determines a plan for manipulating the components 102. The component sorting algorithm calculates a series of movements for the positioning system 120 to efficiently move one or more of the components 102. The component sorting algorithm may determine an efficient motion profile for agitating the tray 132 to properly orient the components 102. For example, the component sorting algorithm may determine a series of movements that will separate or spread out the components 102 and then cause the components 102 to become axially aligned with the direction of movement (e.g. aligned front to back) based on the observed positions of the components 102. Because the components 102 are initially randomly distributed on the tray 132 (e.g. dropped onto the tray 132 from a bin in any angular orientation), the agitation unit 124 needs to manipulate the components 102 to align the components 102 in a particular orientation, such as parallel to the direction of movement of the components 102 down the tray 132. The motion profile is specific to the particular arrangement of the components 102 and is based upon the in situ orientation of the components and is automatically generated and updated by the controller 128 on the fly.

In an exemplary embodiment, the illumination source 148 emits light onto the components 102 to assist the controller 128 in identifying the individual components 102. The identification process may be based on the intensity of the light, which may identify boundaries of the components 102 relative to the tray 132 in the image. For example, the components 102 may have different intensity levels in the image, which aids the controller 128 in identifying the components 102.

The controller 128 controls the X, Y, Z and angular position of the component gripper 122 during operation of the component feeding system 100. The controller 128 controls the X, Y, Z and angular position of the camera 104 during operation of the component feeding system 100. The controller 128 uses the component sorting algorithm to develop a motion profile for picking and placing each of the components 102. The camera 104 images the arrangement of the components 102 and the controller 128 determines a series of steps to efficiently manipulate the components 102 into proper positions for picking up by the component gripper 122. The component sorting algorithm develops a motion profile, which includes a series of movements of the component gripper 122, for picking and placing the individual components 102. The controller 128 may change the motion profile as the components 102 move due to the agitation of the tray 132 by the agitation unit 124.

Figure 3:
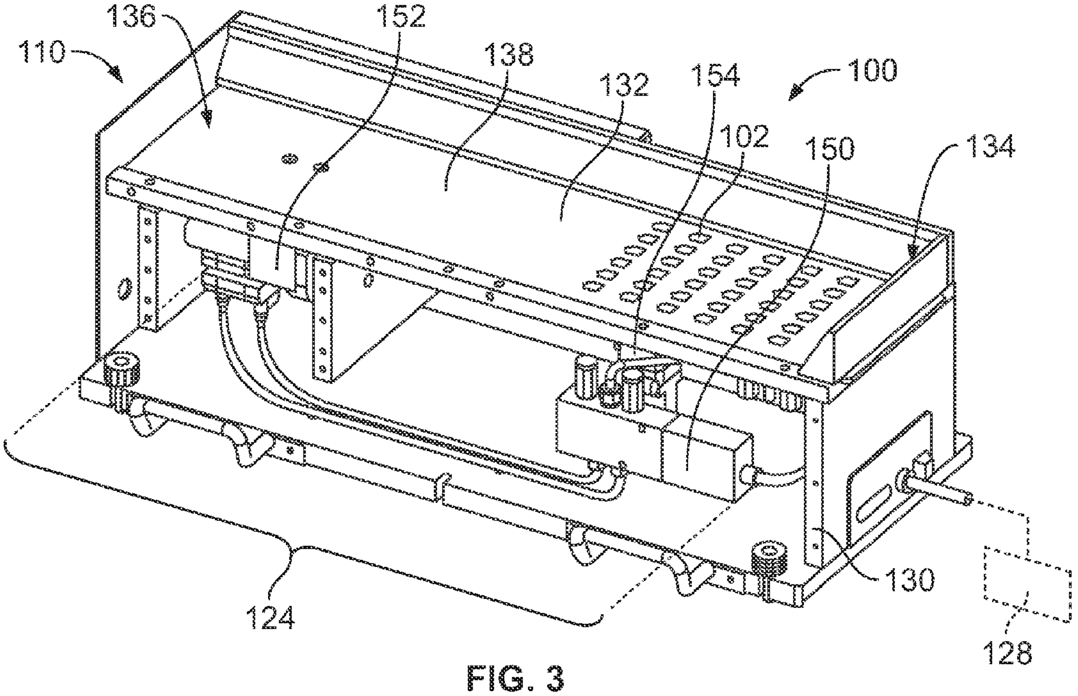
FIG. 3 is a perspective view of a portion of the component feeding system illustrating an agitation unit.
Figure 5:
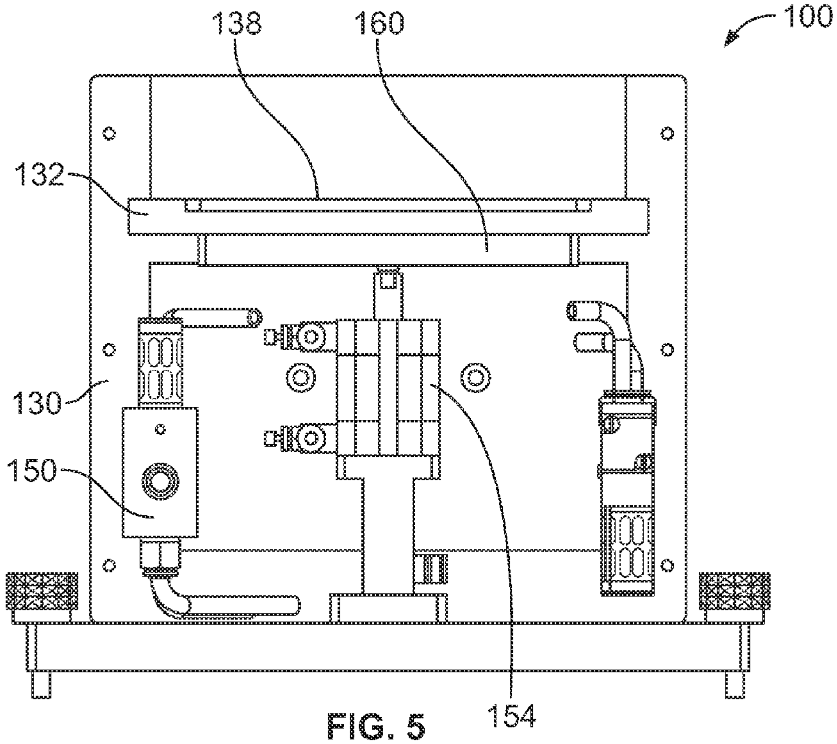
FIG. 5 is an end view of a portion of the component feeding system showing the agitation unit.
Figure 4:
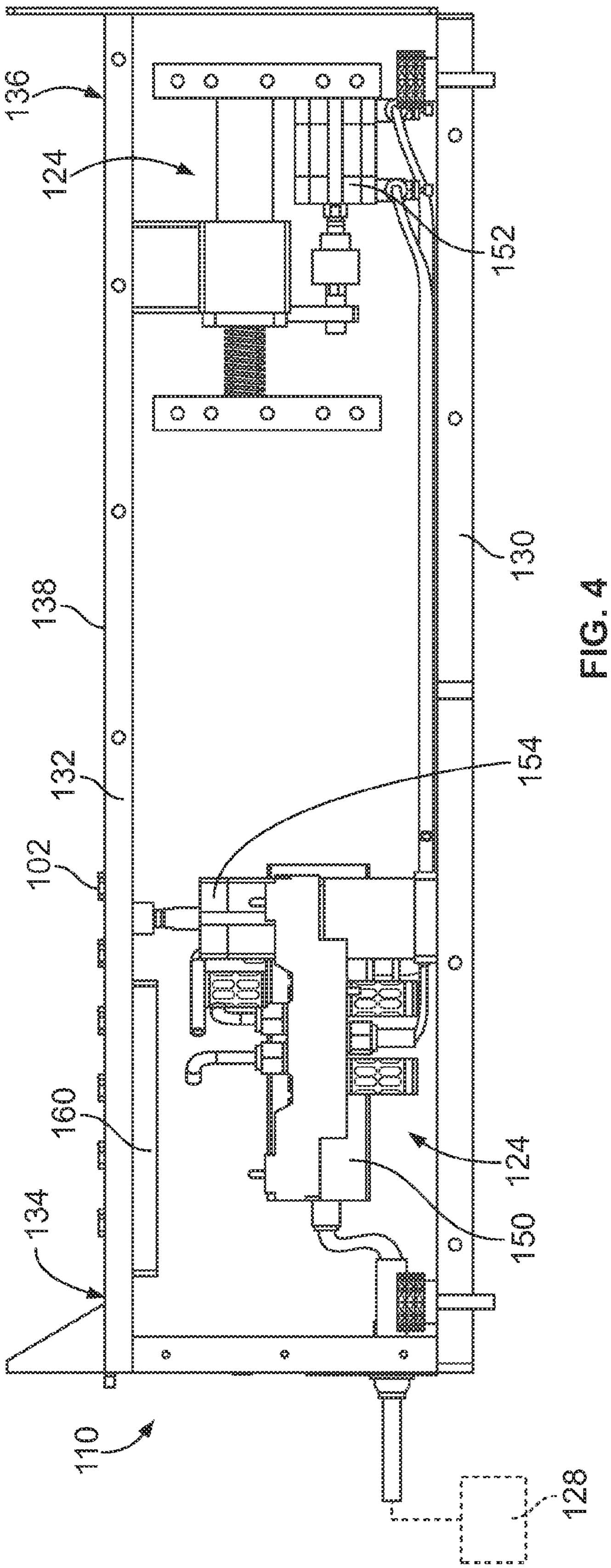
FIG. 4 is a side view of a portion of the component feeding system showing the agitation unit.

FIG. 3 is a perspective view of a portion of the component feeding system 100 with a portion of the frame 130 removed to illustrate the agitation unit 124. FIG. 4 is a side view of a portion of the component feeding system 100 showing the agitation unit 124 positioned with respect to the tray assembly 110. FIG. 5 is an end view of a portion of the component feeding system 100 showing the agitation unit 124 positioned with respect to the tray assembly 110. The agitation unit 124 is housed within the frame 130 below the tray 132. The agitation unit 124 is operated to agitate the tray 132.

The agitation unit 124 includes at least one agitator and a driver 150 that is used to drive the agitator. The agitators may cause movement of the components 102 by invoking directional differential acceleration. In the illustrator embodiment, the agitation unit 124 includes a first agitator 152 and a second agitator 154. The first agitator 152 and the second agitator 154 are configured to agitate or vibrate the tray 132 in different directions. For example, the first agitator 152 is configured to vibrate the tray 132 back and forth in an axial direction along a longitudinal axis of the tray 132 between the front 134 and the rear 146. The first agitator 152 may be referred to herein after as a back and forth agitator 152. The second agitator 154 agitates or vibrates the tray 132 in an up and down direction. The second agitator 154 may be used to flip the components 102 on the tray 132 by forcing the components 102 upward off of the component support surface 138. The second agitator 154 may be referred to hereinafter as a flipping agitator 154. The second agitator 154 may agitate the tray 132 in a direction generally perpendicular to the back and forth agitation of the first agitator 152. Optionally, the agitation unit 124 may include other agitators, such as a side to side agitator that agitates the tray 132 in a side to side direction generally perpendicular to the back and forth agitation of the first agitator 152. Other types of agitators may be used in addition to the agitators described above.

In an exemplary embodiment, the first and second agitators 152, 154 are coupled to the tray 132 such that, as the agitators 152, 154 shake back and forth or up and down, the tray 132 is moved with the agitators 152, 154. The agitators 152, 154 impart mechanical vibration to the tray 132 to move the components 102 on the tray 132. The mechanical vibration may cause the components 102 to spread apart from one another and/or to be oriented in a particular arrangement relative to one another and relative to the tray 132. For example, the agitators 152, 154 may be operated to cause the component 102 to be axially aligned along the longitudinal axis of the tray 132 as the components 102 are moved down the tray from the rear 136 toward the front 134 where the components 102 may be picked up by the component gripper 122 (shown in FIG. 2).

The driver 150 is used to operate the agitators 152, 154. The driver 150 may be communicatively coupled to the controller 128. Control signals from the controller 128 caused the driver 150 to operate the agitators 152 and/or 154 in a particular way to vibrate the tray 132. The driver 150 may control the frequency, direction and amplitude of agitation of the tray 132 in accordance with a motion profile established by the controller 128. In an exemplary embodiment, the agitation unit 124 is pneumatically driven. The driver 150 may include an air compressor and valves for driving the agitators 152, 154. The agitators 152, 154 are connected to the driver 150 by hoses or other air lines. The agitation unit 124 may be driven by other types of systems other than a pneumatic system. For example, the agitation unit 124 may include electric motors, such as servo motors that drive the agitators 152, 154. The agitation unit 124 may include mechanical cams that are used to drive the agitators 152, 154. The agitation unit 124 may be driven by a hydraulic system.

In an exemplary embodiment, a backlight 160 is coupled to the tray assembly 110. The backlight 160 is used to light the tray 132. In an exemplary embodiment, the tray 132 is translucent to allow the light from the backlight 160 to pass therethrough. The backlight 160 illuminates the tray 132 to help the guidance system 126 recognize the components 102. For example, the lighting from the backlight 160 may shine through the tray 132, however the light will be blocked by the components 102. The camera 104 may recognize the difference in intensity of the lighting through the tray 132 around the component 102 to identify the location and orientation of the component 102 on the tray 132. In an exemplary embodiment, the agitation unit 124 separates each of components 102 such that light from the backlight 160 is visible around the periphery of each of the components 102 to help identify the components 102.

The backlight 160 is communicatively coupled to the controller 128. In an exemplary embodiment, the light spectrum and intensity of the backlight 160 can be controlled by the controller 128 to change the lighting scheme for the component feeding system 100. Optionally, when different components 102 are fed along the tray 132, the lighting scheme may be different. Optionally, the lighting scheme may be different along different portions of the tray 132 depending on where the various components 102 are located on the tray 132 and/or what type of components 102 are arranged on certain portions of the tray 132. The lighting scheme may be controlled based on images taking by the camera 104.

Figure 6:
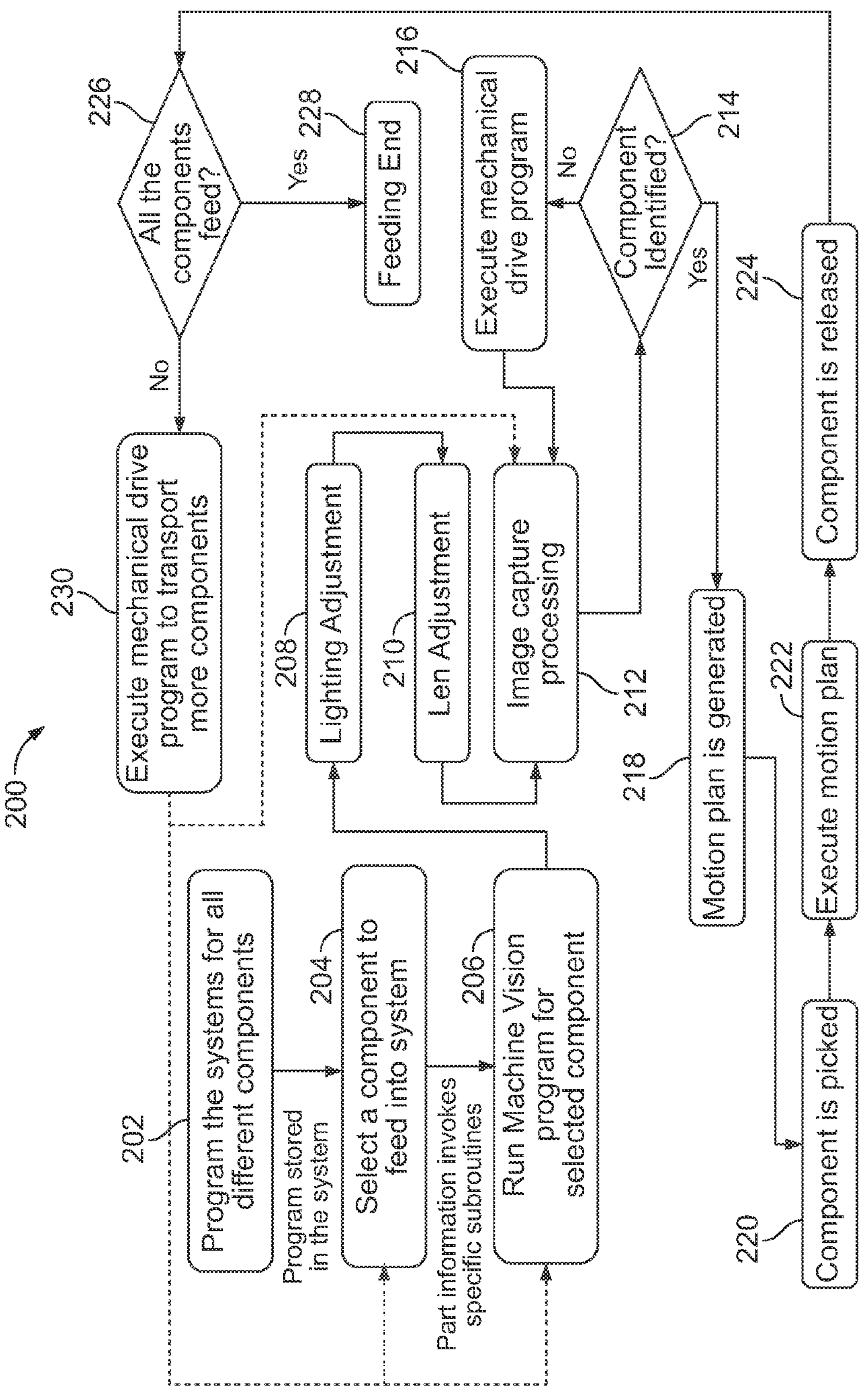
FIG. 6 provides a flowchart of a method for operating a component feeding system.

FIG. 6 provides a flowchart of a method 200 for operating a component feeding system 100. In various embodiments, the method 200, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 200 may be able to be used as one or more algorithms to direct hardware to perform operations described herein. For example, the algorithms may be performed by the controller 128 to operate the positioning system 120, component gripper 122, agitation unit 124, guidance system 126 and/or backlight 160.

In an exemplary embodiment, the component feeding systems 100 may be used to feed different types of components 102. Different routines or subroutines may be performed by the various subsystems based on the type of component 102. For example, the component gripper 122 may need to grip the particular component 102 in a certain way, the camera 104 may need to focus on a particular part of the component 102, the lighting system may illuminate the tray 132 in a particular way to more easily identity the particular type of component 102, the agitation unit 124 may be operated in a particular way to orient the particular components 102, and the like. The method 200 includes programming 202 the systems for the different components 102 that may be fed by the component feeding system 100.

The method includes selecting 204 a particular component 102 to feed into the component feeding system 100. The type of component 102 may be selected manually by an input or user interface by an operator. Alternatively, the type of component 102 may be selected automatically by the component feeding system 100. For example, the camera 104 may image the components 102 being feed along the tray 132 and the controller 128 may automatically identify the type of components 102.

Once the types of components 102 are determined, the component feeding system 100 runs 206 a machine vision program or subroutine for the particular component 102. The program may include lighting adjustment 208, lens adjustment 210 and image capture processing 212. For example, at 208, the front and backlighting may be controlled to identify the components 102. The controller 128 may adjust the lighting intensity or the lighting spectrum of the optical component 148 and/or the backlight 160. The lighting is provided both above and below the tray 132 to easily identify the boundaries and/or datum surfaces of the components 102. At 210, the controller 128 may adjust the camera 104 and/or other optical components 148 to help identify the components 102. For example, the camera 104 may be focused at a particular area of the tray 132 to view the components 102. At 212, the controller 128 captures images and processes the images. Optionally, the controller 128 may have the camera 104 capture a signal image or alternatively a series of images or a continuous image such as a video. The controller 128 processes the image to identify the components 102.

At 214, the controller 128 determines if a component 102 has been identified or recognized within the image or images. If no part is identified, the controller 128 executes a mechanical drive program 216. The mechanical drive program 216 is used to move the components 102 on the tray 132. For example, the components 102 may be spread out or moved forward along the tray 132 to a different area of the tray 132. The mechanical drive program 216 includes operating the agitation unit 124 to cause the components 102 to move on the tray 132. The controller 128 may have a particular motion profile for the agitation unit 124 based on the type of component 102 or components 102 that are on the tray 132. For example, the agitation unit 124 may be operated in a certain way in order to advance a certain type of component 102. Depending on the particular motion profile that the mechanical drive program 216 executes, the first agitator 152 and/or the second agitator 154 may be operated. The particular motion profile executed by the mechanical drive program 216 may control the frequency, direction and/or amplitude of agitation of the tray 132 to manipulate the orientation of the components 102 relative to the tray 132. After the mechanical drive program 216 is executed, the component feeding system 100 may again capture and processes images using the camera 104, at step 212. Until a part is identified, the component feeding system 100 may continue to execute the mechanical drive program at step 216.

Once a part is identified, such as by identifying a datum or boundary of the component 102, the component feeding system 100 generates a motion plan at 218. For example, a motion profile may be generated for the positioning system 120 and component gripper 122 to pick and place the component 102. The motion profile may be dependent on the type of component 102. At 220, the component 102 is picked up by the component gripper 122. At 222, the motion plan is executed. For example, the positioning system 120 may move the component gripper 122 from above the tray 132 to the receiving unit 114. At 224, the component 102 is released. For example, the component 102 may be placed in the receiving unit 114.

After the motion plan is executed, the component feeding system 100 determines if all the parts are fed, such as at step 226. If all the parts are fed, then the component feeding is concluded and the feeding is ended at step 228. If all the parts are not fed, the component feeding system 100 executes, at 230, a mechanical drive program to transport more components 102 along the tray 132. The component feeding system 100 may return to step 212 to capture and process more images or, if different parts are to be transported by the tray 132, the method may return to step 204 or 206 to select different types of components 102 and/or to run the machine vision program based on the types of components 102 being fed by the tray 132. The component feeding system 100 is operated until all the parts are fed and the feeding process is ended.

Figure 7:
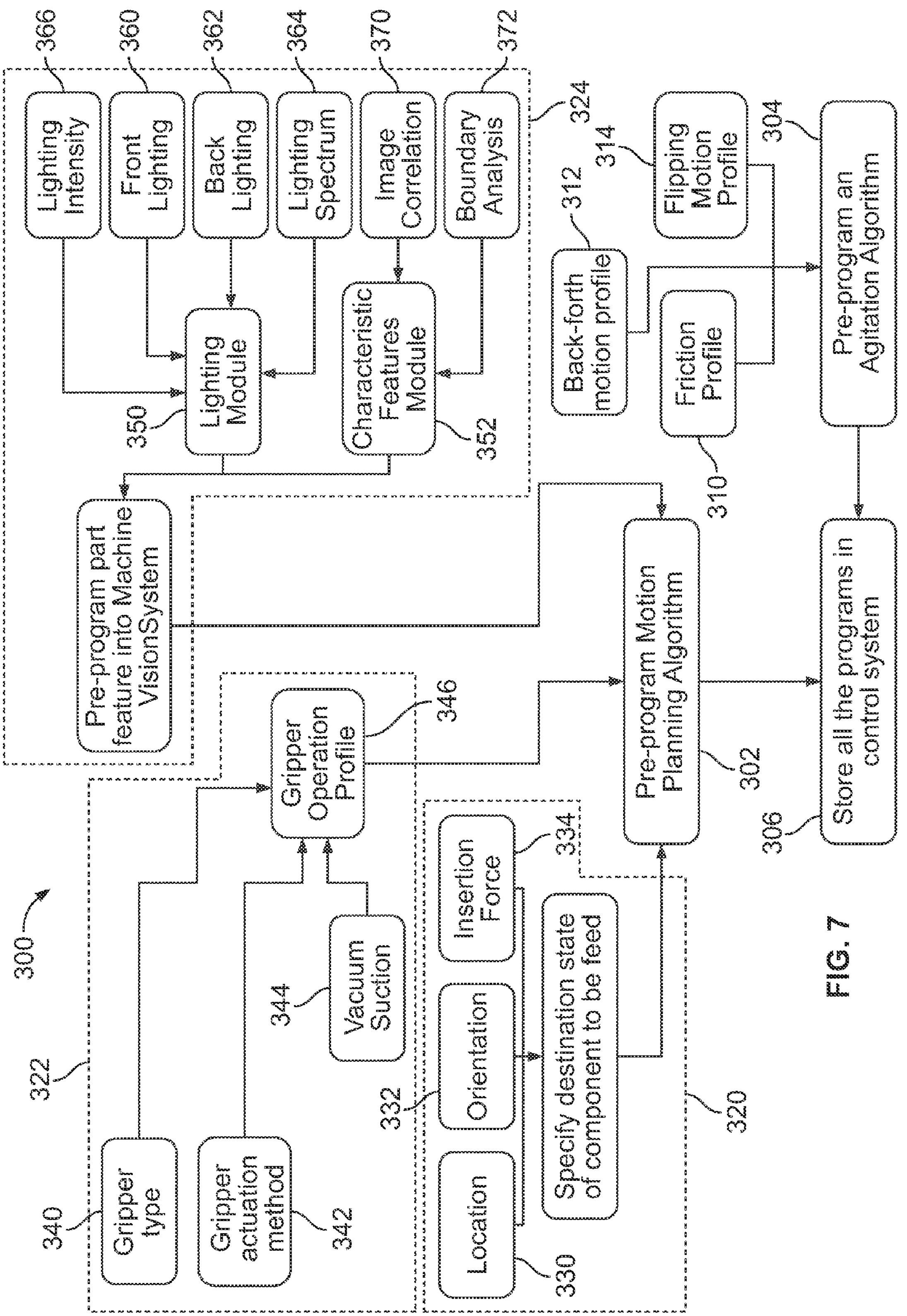
FIG. 7 provides a flowchart of a method for programming a control system for the component feeding system.

FIG. 7 provides a flowchart of a method 300 for programming a control system for the component feeding system 100. In various embodiments, the method 300, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 300 may be able to be used as one or more algorithms to direct hardware to perform operations described herein.

In an exemplary embodiment, the method 300 includes programming a motion planning algorithm at 302, programming an agitation algorithm at 304 and storing the algorithms in the controller at 306. The motion planning algorithm 302 is used to control the positioning system 120, such as to control the component gripper 122 and camera 104. The agitation algorithm 304 is used to control the agitation unit 124. Optionally, the motion planning algorithm and agitation algorithm may be dependent on the type of component 102, wherein different types of components 102 have different motion planning algorithms 302 and/or agitation algorithms 304 associated therewith.

The agitation algorithm 304 is used to control operation of the agitation unit 124. The agitation algorithm 304 may be used as the mechanical drive program 216 (shown in FIG. 6) that is used to control the agitation unit 124. For example, the agitation algorithm 304 may control the operation of the first agitator 152 and the second agitator 154. The agitation algorithm 304 may control the operation of the driver 150. Based on the type of component 102 and the characteristics of the tray 132, such as the friction coefficient of the material of the tray 132 and the surface profile of the tray 132, a friction profile for the component 102 may be determined at 310. A back and forth motion profile may be determined at 312. A flipping motion profile may be determined at 314. Other motion profiles may also be determined, such as a side to side motion profile. The motion profiles may control the frequency, direction and amplitude of agitation of the tray 132. The motion profiles may be designed to control movement of the components 102 on the tray 132. The motion profiles may be based on the friction profile. The friction profile and motion profiles may be input into the controller 128 to determine the agitation algorithm for the particular type of component 102. The agitation algorithm 304 is stored by the controller at 306.

The motion planning algorithm 302 may be used to generate the motion plan 218 (shown in FIG. 6) during operation of the component feeding system 100. The motion planning algorithm 302 may be based on multiple inputs or programs. For example, the motion planning algorithm 302 may be based on a component destination program 320, a gripper program 322, and a machine vision program 324. The component destination program 320 is based on the final destination or location for the component 102. For example, the component destination program 320 determines where and how the component 102 is delivered to the receiving unit 114. The gripper program 322 is based on the type of component gripper 122 and how the component gripper 122 is used to manipulate the component 102, such as to pick up the component 102 and place the component 102 in the receiving unit 114. The machine vision program 324 is used to control the camera 104 and the lighting of the tray 132 and components 102.

The component destination program 320 is programmed dependent on the type of component 102 and the type of receiving unit 114. For example, some components 102 are merely loaded into a bag for shipment to another machine, station or offsite. Other components 102 may be loaded by the component feeding system 100 into a fixture or housing and therefore must be moved to a particular location and in a particular orientation relative to the receiving unit 114. The component destination program 320 may receive inputs such as a location input 330, an orientation input 332 and an insertion force input 334. Such inputs instruct the component feeding system 100 where the component 102 needs to be located, what orientation the component 102 needs to be orientated, and an insertion force needed to load the component 102 into the receiving unit 114. The controller 128 may then determine the component destination program 320 based on the inputs. Other inputs may be provided for determining the component destination program 320.

The gripper program 322 may be dependent on the type of component gripper 122 that is used. The controller 128 may develop the gripper program 322 based on different inputs, such as the type 340 of gripper that is being used, the actuation method 342 of the component gripper 122 and other inputs such as the amount of vacuum suction required 344 for the particular type of component 102. The component gripper 122 may be one of many different types, such as a magnetic gripper, a grasping gripper that uses finger or other elements to grasps the components 102, a vacuum gripper that uses vacuum suction to hold the component 102 or other types of grippers. The grasping type grippers may use different actuation methods, such as a servo motor to close the fingers, pneumatic actuation to close the fingers or other types of actuation. Some types of grippers, such as the vacuum gripper may require different levels of vacuum suction in order to pick up a particular type of component 102. The controller 128 uses the inputs relating to the component gripper 122 to develop the gripper program 322 that is used to control the operation of the component gripper 122.

The machine vision program 322 may be used to control the guidance system 126. The machine vision program 324 uses inputs relating to lighting conditions and characteristic features of the component 102 to develop the machine vision program 324. The lighting module 350 has inputs relating to the front lighting 360, the backlighting 362, the spectrum of lighting 364 and the intensity of lighting 366 all relating to the lighting characteristics that aid the guidance system 126 in recognizing and identifying the components 102. The machine vision program 322 determines a lighting scheme for lighting the tray 132 and component 102 so that the camera 104 is able to image the tray 132 and components 102.

The characteristic features modules 352 uses inputs relating to image correlation, and boundary analysis to determine datum or other characteristic features of the components 102. The boundary analysis may be dependent on the type of component 102 to assist the camera 104 and controller 128 in recognizing particular types of components 102. The controller 128 develops or selects the machine vision program 322 based on the inputs relating to lighting and characteristic features to control operation of the camera 104, front lighting 148 and backlighting 160.

The controller 128 develops the motion planning algorithm 302 based on the inputs from the component destination program 320, the gripper program 322 and the machine vision program 324. The motion planning algorithm 302 is stored for use by the component feeding system 100.

Figure 8:
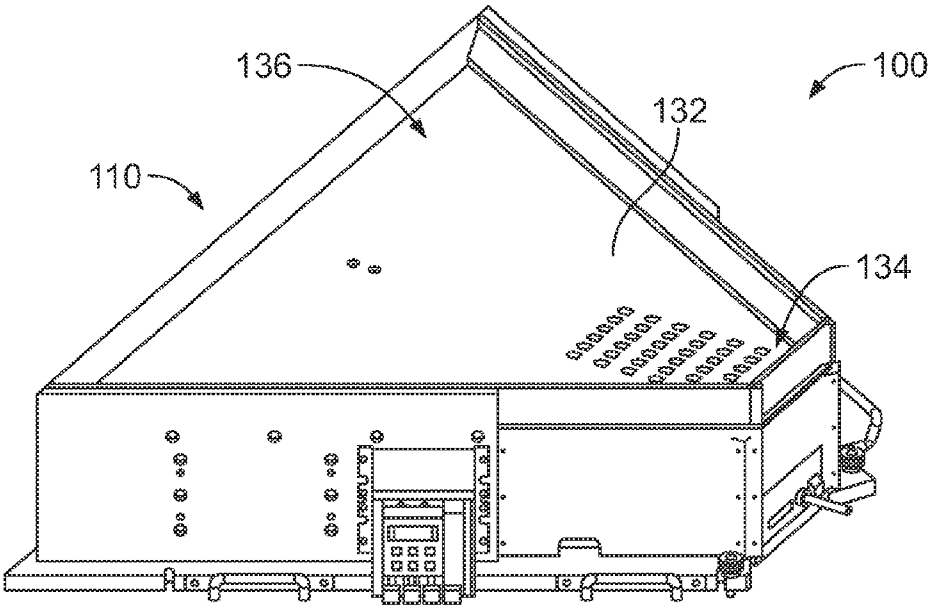
FIG. 8 shows a portion of the component feeding system showing a tray assembly having a different shape.

FIG. 8 shows a portion of the component feeding system 100 showing the tray assembly 110 having a different shape than the shape illustrated in FIG. 2. In the illustrated embodiment, the tray 132 has a generally triangular shape being truncated at the front 134. The tray 132 is wider at the rear 136 and narrower at the front 134. Other shapes are possible in alternative embodiments.

Figure 9:
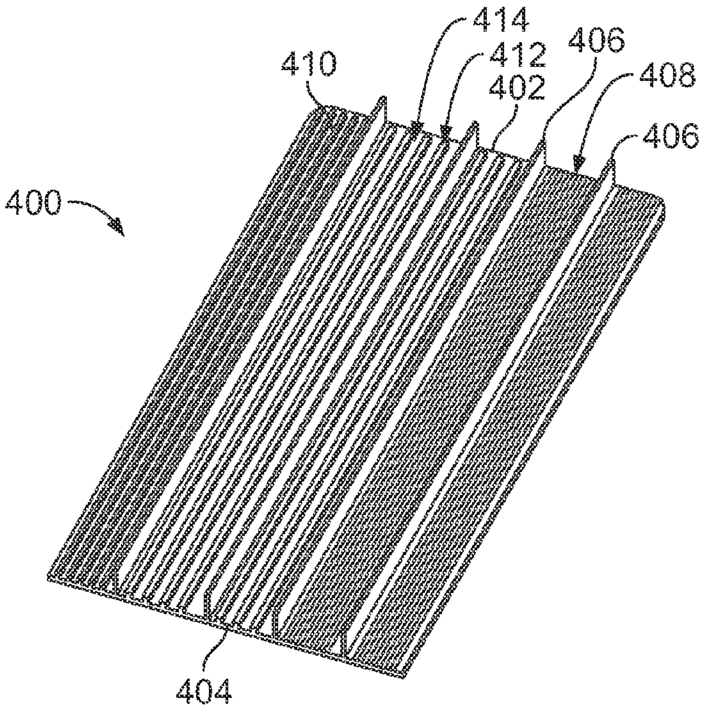
FIG. 9 illustrates a tray formed in accordance with an exemplary embodiment.

FIG. 9 illustrates a tray 400 formed in accordance with an exemplary embodiment. The tray 400 extends between a front 402 and a rear 404. The tray 400 includes dividing walls 406 separating channels 408. Optionally, different types of components 102 (shown in FIG. 2) may be fed into different channels 408 and separated by the dividing walls 406. Optionally, the channels 408 may have different widths.

In an exemplary embodiment, a component support surface 410 of the tray 400 may be non-planar and may include grooves 412 in one or more of the channels 408. The grooves 412 are separated by dividers 414. The grooves 412 may be sized to receive particular types of components 102. For example, some grooves 412 may be sized to receive contacts while other grooves 412 are sized to receive ferrules, plastic spacers, or other types of components 102. Optionally, some of the channels 408 may not include grooves, but rather are flat, such as to receive flat washers or other types of components 102. The grooves 412 help orient the components 102, such as to axially align the components 102 along the longitudinal axis of the tray 400 as well as to spread the components 102 apart from one another for access by the component gripper 122 (shown in FIG. 2). The grooves 412 are shallow enough that the components 102 extend above the dividers 414 for access by the component gripper 122.

Figure 10:
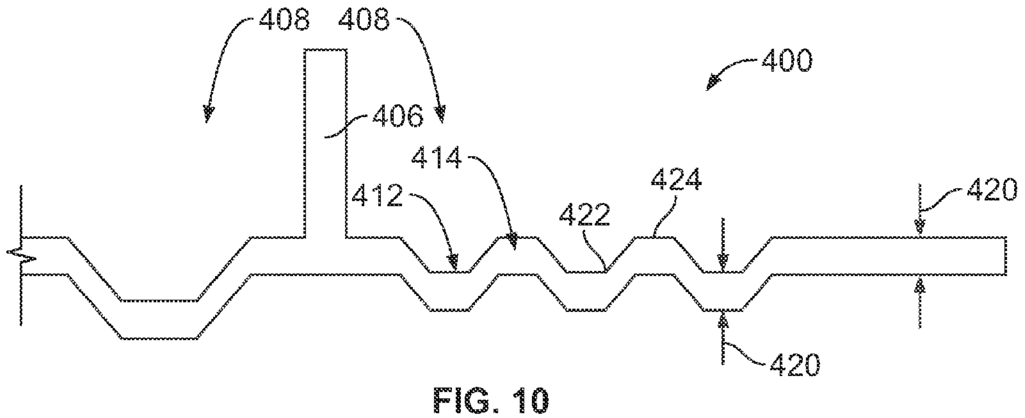
FIG. 10 is a cross-sectional view of a portion of the tray shown in FIG. 9.

FIG. 10 is a cross-sectional view of a portion of the tray 400. In an exemplary embodiment, the tray 400 has a generally uniform thickness 420, such as in the channels 408. For example, the tray 400 has a uniform thickness 420 along the grooves 412 and along the dividers 414. When the tray 400, which is translucent, is backlit by the backlight 180 (shown in FIG. 4), the lighting is uniform. The same amount of light passes through the tray 400 at the grooves 412 and at the dividers 414. The camera 104 (shown in FIG. 2) may more easily identify the components 102 if the lighting is even across the grooves 412 and the dividers 414.

In an exemplary embodiment, the dividers 414 are wedge shaped. The dividers 414 extend from a base 422 to a peak 424. The base 422 is wider than the peak 424. The wedge shape helps eliminate interference with the component gripper 122 (shown in FIG. 2). The component gripper 122 will be less likely to catch on the divider 414 because of the wedge shape. The grooves 412 are shallow enough that the components 102 extend above the dividers 414 for access by the component gripper 122.

Figure 11:
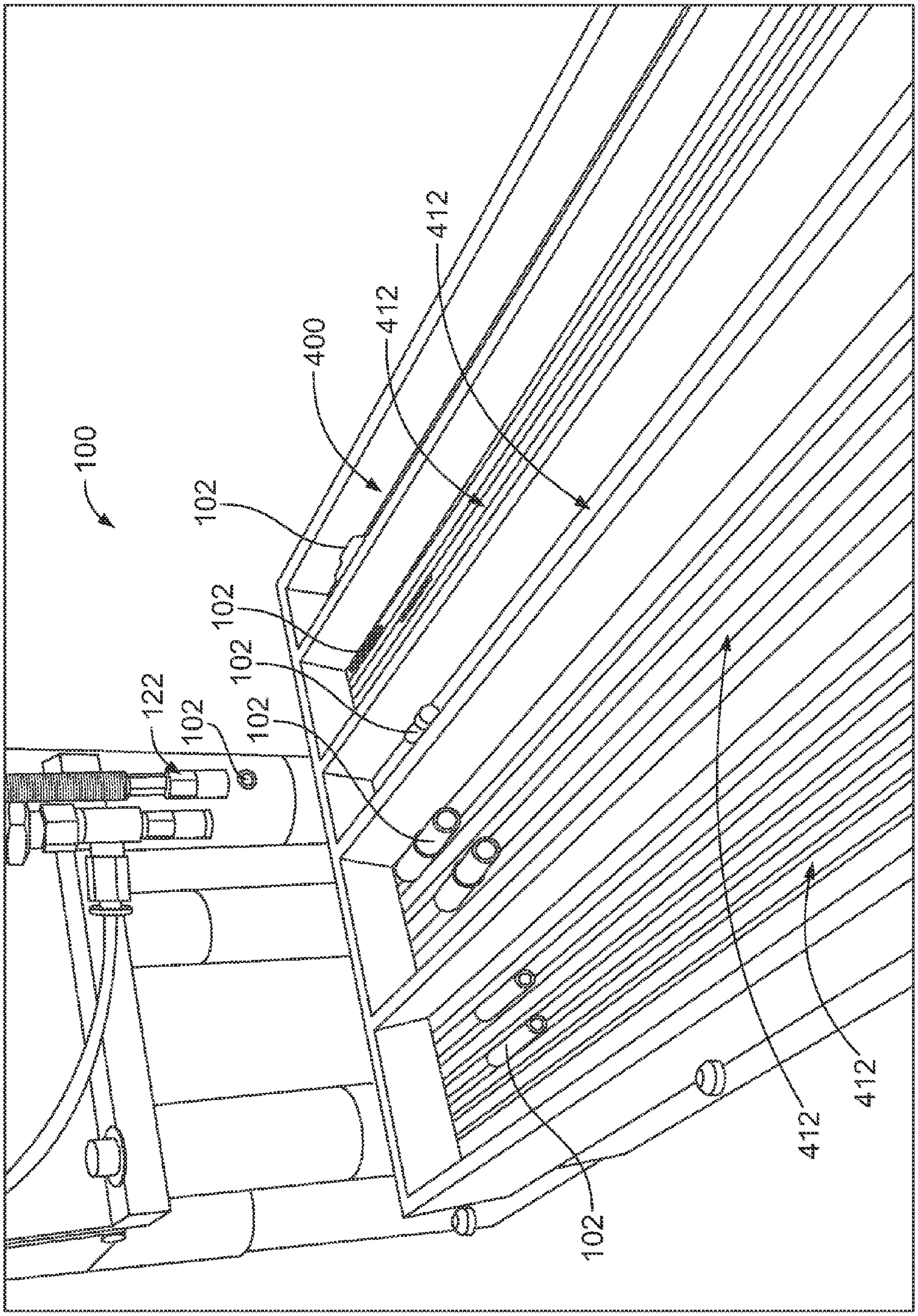
FIG. 11 illustrates a portion of the component feeding system showing components in the tray.

FIG. 11 illustrates a portion of the component feeding system 100 showing components 102 in the tray 400. Different types of components 102 are shown in FIG. 11. The grooves 412 orient the components 102 for picking by the component gripper 122.

Figure 12:
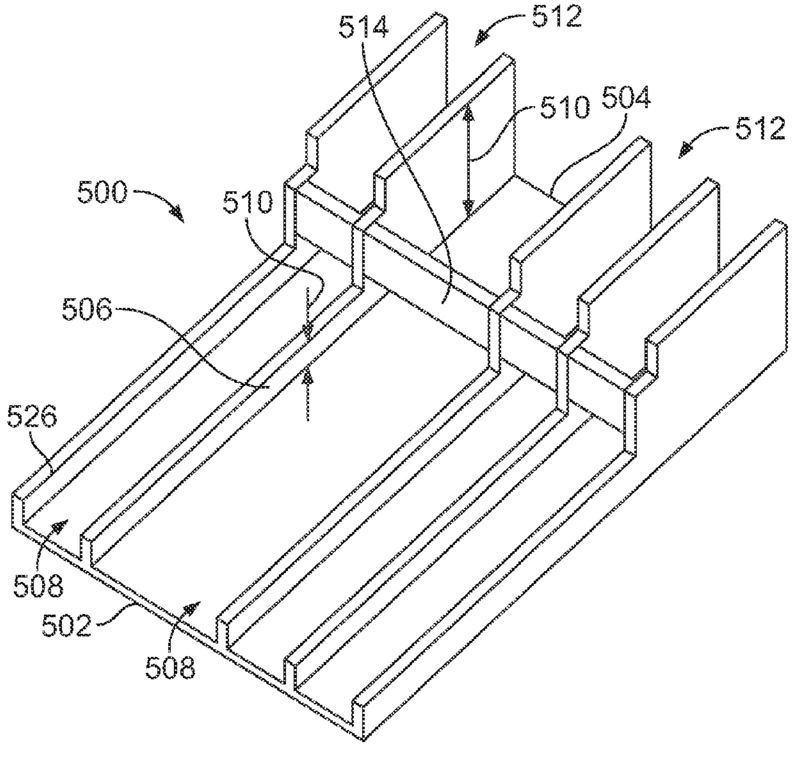
FIG. 12 illustrates a tray formed in accordance with an exemplary embodiment.

FIG. 12 illustrates a tray 500 formed in accordance with an exemplary embodiment. The tray 500 may include dividers and grooves similar to the tray 400 (shown in FIG. 10). The tray 500 extends between a front 502 and a rear 504. The tray 500 includes dividing walls 506 separating channels 508. Optionally, different types of components 102 (shown in FIG. 2) may be fed into different channels 508 and separated by the dividing walls 506. The dividing walls 506 may be extensions of certain dividers between grooves in the tray 500.

In an exemplary embodiment, the dividing walls 506 have different heights 510 along different sections of the dividing walls 506. For example, at the rear 504, the dividing walls 506 are taller and at the front 502 the dividing walls 506 are shorter. At the rear, the dividing walls 506 define bins 512 that receive a large amount of the components 102. The bins 512 hold a supply of the components 102 that are eventually fed into the tray 500. In an exemplary embodiment, the tray 500 includes gates 514 between the dividing walls 506. The gates 514 hold the components in the bins 512 such that a limited amount of the components 102 may be released at a time. The gates 514 may limit to a single layer of the components forward of the gates 514. The spacing of the gates 514 off of the component support surface of the tray 500 may vary depending on the type of component 102 within the bin 512.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A component feeding system comprising:

a platform;

a tray supported by the platform, the tray having a component support surface for supporting a plurality of components thereon;

an agitation unit supported by the platform and operatively coupled to the tray, the agitation unit agitating the tray to cause the components to move on the tray;

a guidance system supported by the platform, the guidance system having a camera viewing the tray;

a positioning system supported by the platform;

a component gripper supported by the positioning system and moved by the positioning system relative to the tray, the component gripper being configured to pick and place components on the tray; and a controller communicating with the agitation unit, the positioning system, the component gripper and the guidance system, the controller operating the agitation unit, the positioning system and the component gripper based on an image obtained by the camera;

wherein the controller develops a motion profile for the agitation unit based on an image obtained by the camera, the motion profile controlling at least one of a frequency, direction and amplitude of agitation of the tray to manipulate the orientation of the components relative to the tray, and wherein the controller develops a motion profile for the positioning system based on an image obtained by the camera to move the component gripper.

2. The component feeding system of claim 1, wherein the camera is configured to differentiate the components based on one or more datum on the components, the controller operating the positioning system to control a position of the component gripper based on the location of the one or more datum of the component.

3. The component feeding system of claim 1, wherein the motion profile controlling the agitation of the tray is progressively updated based on the images of re-orientation of the components relative to the tray.

4. The component feeding system of claim 1, wherein the controller operates the agitation unit in a forward mode to cause the components to move toward a front of the tray and wherein the controller operates the agitation unit in a backward mode to cause the components to move toward a rear of the tray.

5. The component feeding system of claim 1, wherein the controller operates the agitation unit in an impulse mode to cause the components to bounce upward off of the tray.

6. The component feeding system of claim 1, wherein the motion profile for the positioning system to move the component gripper includes movements for picking up a first component of the plurality of components, moving the first component to a predetermined location and then picking up a second component of the plurality of components.

7. The component feeding system of claim 1, wherein the tray is configured to receive different types of components, the controller determines the type of components based on the image obtained from the camera, the controller determining an agitation algorithm to adjust an agitation protocol of the agitation unit based on the type of component.

8. The component feeding system of claim 1, wherein the component gripper comprises at least one of a magnet, fingers and a vacuum device for gripping the components.

9. The component feeding system of claim 1, wherein the positioning system includes an X positioner, a Y positioner, and a Z positioner to control a position of the component gripper in 3D space.

10. The component feeding system of claim 1, wherein the positioning system includes an arm supporting the component gripper, the arm supporting a lighting device illuminating the tray and components.

11. The component feeding system of claim 1, further comprising a backlight under the tray, the tray being translucent to allow light from the backlight through the tray.

12. The component feeding system of claim 11, wherein the backlight is operatively coupled to the controller, the controller changing a spectrum and intensity of the light based on characteristics of the components on the tray.

13. The component feeding system of claim 11, wherein the backlight is operatively coupled to the controller, the controller determining a lighting control algorithm to adjust the lighting scheme of the backlight based on the image obtained by the camera.

14. A component feeding system comprising:

a platform;

a tray supported by the platform, the tray having a component support surface for supporting a plurality of components thereon;

an agitation unit supported by the platform and operatively coupled to the tray, the agitation unit agitating the tray to cause the components to move on the tray;

a guidance system supported by the platform, the guidance system having a camera viewing the tray;

a component gripper movable relative to the tray, the component gripper being configured to pick and place components on the tray;

a positioning system supported by the platform, wherein the positioning system includes an arm supporting the component gripper, the arm supporting the camera, the camera being movable with the arm and the component gripper; and a controller communicating with the agitation unit, the positioning system, the component gripper and the guidance system, the controller operating the agitation unit, the positioning system and the component gripper based on an image obtained by the camera.

15. A component feeding system comprising:

a platform;

a tray supported by the platform, the tray having a component support surface for supporting a plurality of components thereon, the tray includes a plurality of grooves separated by dividers, different types of components being arranged in different grooves and separated by the dividers, wherein a height of each divider is less than a height of the components in the groove adjacent the divider such that at least a portion of the component is positioned above a peak of the divider;

an agitation unit supported by the platform and operatively coupled to the tray, the agitation unit agitating the tray to cause the components to move on the tray;

a guidance system supported by the platform, the guidance system having a camera viewing the tray;

a positioning system supported by the platform;

a component gripper supported by the positioning system and moved by the positioning system relative to the tray, the component gripper being configured to pick and place the different types of components on the tray; and a controller communicating with the agitation unit, the positioning system, the component gripper and the guidance system, the controller operating the agitation unit, the positing system and the component gripper based on an image obtained by the camera.

16. The component feeding system of claim 15, wherein the tray extends between a front and a rear, at least some of the dividers extending from the component support surface to define dividing walls, channels being formed between dividing walls, the dividing walls at the rear being taller to define bins holding supplies of the different types of components, the components being fed into corresponding channels toward the front of the tray from the bins as the tray is agitated.

17. The component feeding system of claim 15, wherein the dividers extend from a base to a peak, the base being wider than the peak.

18. The component feeding system of claim 15, wherein the tray has a generally uniform thickness along both the grooves and the dividers.

19. The component feeding system of claim 15, wherein the controller develops a motion profile for the positioning system to move the component gripper.

20. The component feeding system of claim 15, wherein the controller develops a motion profile for the positioning system to move the component gripper, the motion profile having movements for picking up a first component of the plurality of components, moving the first component to a predetermined location and then picking up a second component of the plurality of components.

* * * * *